(12) United States Patent
Kikuiri

(10) Patent No.: US 6,683,760 B1
(45) Date of Patent: Jan. 27, 2004

(54) THIN FILM MAGNETIC HEAD COMPRISING TRACK POSITIONING MARKER

(75) Inventor: Katsuya Kikuiri, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 59 days.

(21) Appl. No.: 09/670,145

(22) Filed: Sep. 26, 2000

(30) Foreign Application Priority Data

Sep. 27, 1999 (JP) .......................................... 11-271777

(51) Int. Cl.$^7$ ................................................ G11B 5/39
(52) U.S. Cl. ...................................................... 360/319
(58) Field of Search ................................. 360/317, 319, 360/113, 83, 85, 87, 86, 318, 221, 231, 88, 271.5; 29/603.14

(56) References Cited

U.S. PATENT DOCUMENTS

| | | | |
|---|---|---|---|
| 4,071,868 A | * | 1/1978 | Kaminaka et al. ........... 360/113 |
| 4,763,210 A | * | 8/1988 | Grant .......................... 242/335 |
| 5,202,807 A | | 4/1993 | Okada et al. |
| 5,715,122 A | | 2/1998 | Ohmori et al. |
| 5,722,157 A | * | 3/1998 | Shouji et al. ............. 29/603.14 |
| 5,866,212 A | | 2/1999 | Kurosawa et al. |
| 5,910,868 A | | 6/1999 | Kurosawa et al. |
| 5,978,188 A | * | 11/1999 | Kaaden et al. ............... 360/121 |
| 6,057,991 A | * | 5/2000 | Ishiwata et al. ............ 360/113 |
| 6,115,216 A | * | 9/2000 | Yoda et al. ................. 360/317 |
| 6,261,468 B1 | * | 7/2001 | Sato et al. ..................... 216/22 |
| 6,285,532 B1 | * | 9/2001 | Sasaki ......................... 360/317 |
| 6,305,072 B1 | * | 10/2001 | Yoda et al. .............. 29/603.14 |
| 6,342,993 B1 | * | 1/2002 | Sato ............................ 360/319 |

FOREIGN PATENT DOCUMENTS

| | | |
|---|---|---|
| JP | 05-143927 | 6/1993 |
| JP | 06-301936 | 10/1994 |
| JP | 08-129720 | 5/1996 |
| JP | 2001-067610 | 3/2001 |

OTHER PUBLICATIONS

US 5,819,396, 10/1998, Lee (withdrawn)

\* cited by examiner

*Primary Examiner*—Robert S. Tupper
(74) *Attorney, Agent, or Firm*—Brinks Hofer Gilson & Lione

(57) ABSTRACT

A thin film magnetic head that is ready for positioning of the elevation of the MR layer and most suitable for high density recording to be used for the helical scan type magnetic recording and reproducing apparatus, comprising a lower shield layer formed on a substrate, a lower gap layer formed on the upper shield layer, a magnetoresistive layer formed on the lower shield layer via the lower gap layer, an upper gap layer formed on the magnetoresistive layer, and an upper shield layer formed on the magnetoresistive layer via the upper gap layer, besides providing a convex portion on the principal face of the upper shield layer.

5 Claims, 17 Drawing Sheets

THIN FILM MAGNETIC HEAD COMPRISING TRACK POSITIONING MARKER

BACKGROUND OF THE INVENTION

1. Field of the Invention

The present invention relates to a thin film magnetic head to be used for a helical scan type magnetic recording and reproducing apparatus, particularly to a magnetoresistive magnetic head for use in a reproducing a magnetic head.

2. Description of the Related Art

FIG. 24 shows a perspective view of the rotary drum of the conventional helical scan type magnetic recording and reproducing apparatus; FIG. 25 is a plane view for describing the recording method in the helical scan type magnetic recording and reproducing apparatus; FIG. 26 is a plane view showing the construction of the composite type magnetic head; FIG. 27 is a perspective view showing the construction of the magnetic head mounted on the base board of the rotary drum; FIG. 28 is a plane view of the construction of the magnetic head mounted on the rotary drum viewed from the sliding face side of the recording medium; FIG. 29 includes an enlarged construction of the area X in FIG. 28, and shows a plane view for describing the elevation adjustment of respective MR layers of the two magnetic heads; FIG. 30 shows a plane view of the reproduction track during reproduction when respective MR layers of the two magnetic heads have different elevations one another; and FIG. 31 a plane view showing how mounting errors occur when the magnetic head is mounted on the base board.

A line of information has been recorded and reproduced by a helical scan method in the magnetic recording and reproducing apparatus such as a VCR (Video Cassette Recorder) and a recording and reproducing unit for a computer using a magnetic tape as a magnetic recording medium. A plurality of the magnetic heads have been used in the helical scan type magnetic recording and reproducing apparatus in order to improve recording density and data transfer rate, wherein two magnetic heads 70 and 80 are mounted on a rotary drum 61 at two opposed positions on the outer circumference face as shown, for example, in FIG. 24.

Signals are recorded on the magnetic tape 63 wound on the rotary drum 61, or the signals recorded on the magnetic tape 63 are reproduced using these magnetic heads 70 and 80. As shown in FIG. 25, for example, signals are recorded by a so-called guard-band-less method so that a recording track T12 is made to partially overlap an area of another track T11 where signals have been recorded by the magnetic heads 70 immediately before recording with the magnetic head 80, when the rotary drum 61 is driven to rotate to record the signals from the magnetic head 80 on the magnetic tape 63. On the other hand, respective magnetic heads 70 and 80 sequentially scan the corresponding recording tracks T11 and T12 for reproduction.

A MIG (Metal-In-Gap) type head and a lamination type head have been used for the magnetic heads 70 and 80 to be used for the helical scan type magnetic recording and reproducing apparatus.

Track width has been narrowed or the recording frequency has been increased for realizing high density recording on the magnetic recording medium in the data recording and reproducing apparatus for use in the VTR and computer. As a result, the magnetic gap is also required to be narrow in compliance with narrowing the track width.

However, it is difficult to make the MIG head small size because the magnetic gap is formed by mechanical cutting to make it impossible to meet the requirement of narrowing the track width. While a high polishing accuracy of the abutting faces is required for forming the magnetic gap meeting the requirement of narrowing the track width, the polishing accuracy for the fine magnetic gap has been hardly improved. While inductance should be also low for complying with the requirement of making the recording frequency high, on the other hand, it is impossible to lower the inductance in the MIG head and lamination type head. Furthermore, the MIG head and lamination type head also have a drawback that their reproduction outputs cannot be made to be sufficiently high when one attempts to increase the recording density.

In the magnetic recording and reproducing apparatus such as a hard disk device, on the other hand, various thin film magnetic heads have been used. Commonly used thin film magnetic heads mainly comprise an induction type magnetic head (an inductive head) and reproducing magnetic heads include a magnetoresistive magnetic head (a MR head). A composite type magnetic head formed by laminating the inductive head and the MR head has been also frequently used.

Such thin film magnetic heads as described above are advantageous in that they are suitable for mass production in one lot by using a thin film deposition process, and that they are able to meet the requirement of making the dimension fine for narrowing the magnetic gap for use in the track having a narrow width. The MR head is particularly suitable for high frequency recording since it is not dependent on the relative velocity of the magnetic recording medium to enable it to directly respond to the signal magnetic field to obtain a high reproduction output, besides its inductance is considerably lower as compared with the MIG head and lamination type head.

Accordingly, use of the thin film magnetic head described above as a magnetic head is also desirable in the helical scan type magnetic recording and reproducing apparatus.

When the composite type magnetic head is applied for the magnetic heads 70 and 80 of the helical scan type magnetic recording and reproducing apparatus, for example, the magnetic head 70 is composed of a MR head 71 and an inductive head 72 as shown in FIG. 26. The MR heads 71 is formed by sequentially laminating an insulation layer 71$b$, a lower shield layer 71$c$, a lower gap layer 71$d$, a MR layer 71$e$, an upper gap layer 71$f$ and an upper shield layer 71$g$ on a base board 71$a$. Pulled-out electrodes and hard layers are not shown in the drawing. The inductive head 72 is constructed by sequentially laminating a gap layer 72$b$, an upper core layer 72$c$ and an insulation layer 72$d$ on a lower core layer 72$a$ that also serves as the upper shield layer. The portion inserted between the lower shield layer 71$c$ and the upper shield layer 71$g$ serves as a read magnetic gap Ga' of the MR head 71. The portion inserted between the lower core layer 72$a$ and the upper core layer 72$c$ serves as a write magnetic gap Gb' of the inductive head 72.

The magnetic head 70 is mounted on a base board 62 by being slanted at an azimuth angle àx', and the base board 62 on which the magnetic head 70 is mounted is attached at a prescribed position on the outer circumference face of the rotary drum 61.

Likewise, the magnetic head 80 is composed of a MR head 81 having a MR layer 81$e$ and an inductive head 82 as shown in FIG. 29, and has a read magnetic gap Ga" and a write magnetic gap Gb". The magnetic head 80 is also mounted on the base board 62 by being slanted at an azimuth angle Ay as shown in FIGS. 24 and 29, and the base board 62 on which the magnetic head 80 is mounted is attached at a prescribed position on the circumference face of the rotary drum 61.

Since the magnetic heads 70 and 80 are alternately used for continuous recording and reproduction in the helical scan type magnetic recording and reproducing apparatus making use of the magnetic heads 70 and 80 comprising the foregoing thin film magnetic head, it is required that the MR layer 71e of the MR head 71 is located at an approximately the same elevation as that of the MR layer 81e of the MR head 81 from the base board 62 as shown in FIG. 29. In other words, the elevation h1 as measured from the base board 62 to the end of the MR layer 71e is approximately equal to the elevation h2 as measured from the base board 62 to the end of the MR layer 81e. The reason will be described below.

When the elevation h1 as measured from the base board 62 to the end of the MR layer 71e is different from the elevation h2 as measured from the base board 62 to the end of the MR layer 81e, the positions of the recording tracks T11 and T12 of the MR heads 71 and 81 turn out to be relatively different from the positions of the reproduction tracks R11 and R12 of the MR heads 71 and 81, respectively, as shown in FIG. 30, thereby causing poor reading. In other words, the position of the reproduction track R12 of the MR head 81 does not come to the center of the recording track T12 when the signal on the recording track T12 is reproduced, even when the position of the reproduction track R11 of the MR heads 71 is adjusted to come at the center of the width of the recording track T11 as shown in FIG. 30. Consequently, the MR head 81 reproduces the recorded signals at the off-center positions of the recording track T12, thereby the reproduction output of the recorded signals on the recording track T12 is reduced to make continuous and proper reproduction to be difficult. Accordingly, the elevations h1 of the MR layer. 71e of the MR head 71 and the elevation h2 of the MR layer 81e of the MR head 81 as measured from the base board 62 should be equal one another in the helical scan type magnetic recording and reproducing apparatus.

As disclosed by the inventors of the present invention in Japanese Patent Application No. 11-83701, however, the MR heads 71 and 81 are manufactured via a step for cutting the base board 71a and 81a with a prescribed angle in the production process for providing azimuth angles àx' and àx'. Consequently, dimensional errors may be caused in the cutting step to arise positional distributions of the MR layers 71e and 81e.

Also, mounting errors cannot be ignored since the magnetic heads 70 and 80 may be sometimes mounted on the base board 62 by being shifted toward the direction of elevation h as shown in FIG. 30. As a result, the elevation h1 of the MR layer 71e of the MR head 71 may be different from the elevation h2 of the MR layer 81e of the MR head 81 when measured from the base board 62.

Accordingly, a so-called positioning work of the elevation for adjusting respective end portions of the MR heads to have the same elevation one another is required when these plural magnetic heads are mounted on the base board 62 in the helical scan type magnetic recording and reproducing apparatus, by selecting plural magnetic heads having equal elevations of the MR layers one another in the MR heads.

However, since the MR layers 71e and 81e comprise very thin films, it is difficult to confirm the positions of the MR layers 71e and 81e using, for example, an optical microscope, or it is difficult to select the magnetic heads having the same positions of the MR layers 71e and 81e, or having the same elevations of the end portions of the MR layers 71e and 81e. In addition, the elevation positioning work also takes much time.

SUMMARY OF THE INVENTION

Accordingly, it is an object of the present invention, proposed by taking the forgoing situations into consideration, to provide a thin film magnetic head to be used for the helical scan type magnetic recording and reproducing apparatus that is ready for positioning of elevations of the MR layers, besides being most suitable for high density recording that allows proper recording and reproduction.

The present invention completed for solving the foregoing problems provides a thin film magnetic head comprising a lower shield layer made of a magnetic material formed on a substrate, a lower gap layer made of a non-magnetic material formed on the lower shield layer, a magnetoresistive layer formed on the lower shield layer via the lower gap layer, an upper gap layer made of a non-magnetic material formed on the magnetoresistive layer, and an upper shield layer made of a magnetic material formed on the magnetoresistive layer via the upper gap layer, wherein at least either a convex portion or a concave portion is provided on at least one principal face of both principal faces on at least one shield layer of either the upper shield layer or the lower shield layer.

Since either the convex portion or the concave portion is provided on the shield layer in the thin film magnetic head according to the present invention, at least either the convex portion or the concave portion being provided with a prescribed positional relation to the magnetoresistive layer, the convex portion or the concave portion serves as a marker for specifying the magnetoresistive layer. Consequently, the position of the magnetoresistive layer can be specified by detecting this marker. Consequently, it is made possible in the thin film magnetic head according to the present invention to position the mounting elevation of the respective magnetoresistive layers one another based on the position of the marker.

Preferably, a part of at least either the convex portion or the concave portion provided on the shield layer is provided at a position opposed to the magnetoresistive layer.

Preferably, the thin film magnetic head according to the present invention allows data to be read into a magnetic recording medium by a relative movement against the magnetic recording medium, wherein the end portion of at least either the convex portion or the concave portion provided on the shield layer has an approximately the same elevation as the elevation of the end portion of the magnetoresistive layer by taking the travel direction of the magnetic recording medium relative to the magnetoresistive layer as a reference, thereby allowing the position of the magnetoresistive layer to be readily specified.

Preferably, at least either the concave portion or the convex portion provided on the shield layer has an approximately the same width as the longitudinal width on a sliding face of the recording medium of the magnetoresistive layer.

Both of the convex portion and concave portion provided on the shield layer are preferably provided at a position being out of the position opposing to the upper core layer, when the thin film magnetic head comprises a gap layer made of a non-magnetic material formed on the upper shield layer, and an upper core layer made of a magnetic material formed on the upper shield layer via the gap layer, because the presence of the concave portion or the convex portion does not affect the writing gap due to the arrangement of the convex portion and the concave portion.

DESCRIPTION OF THE PREFERRED EMBODIMENTS

Figure 1:
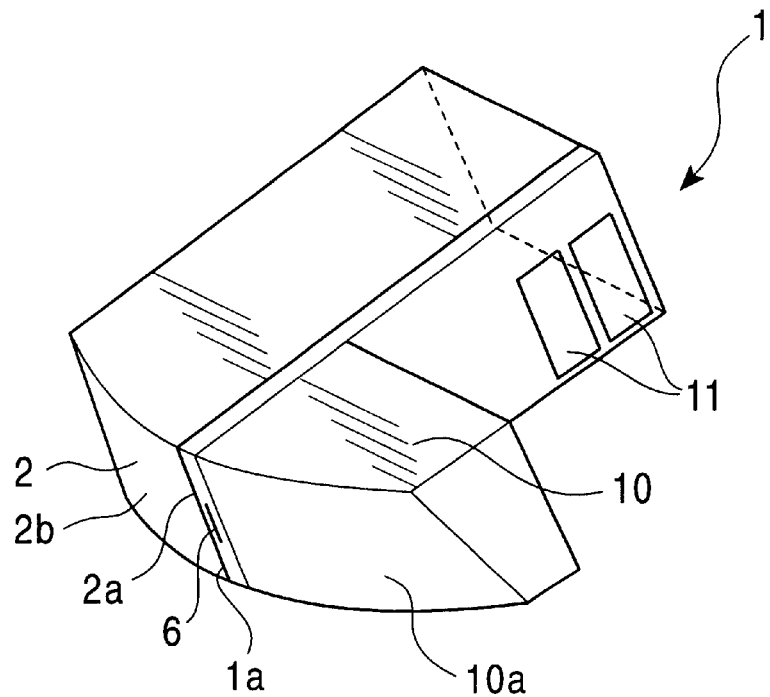
FIG. 1 shows a perspective view of the MR head according to the present invention.
Figure 2:
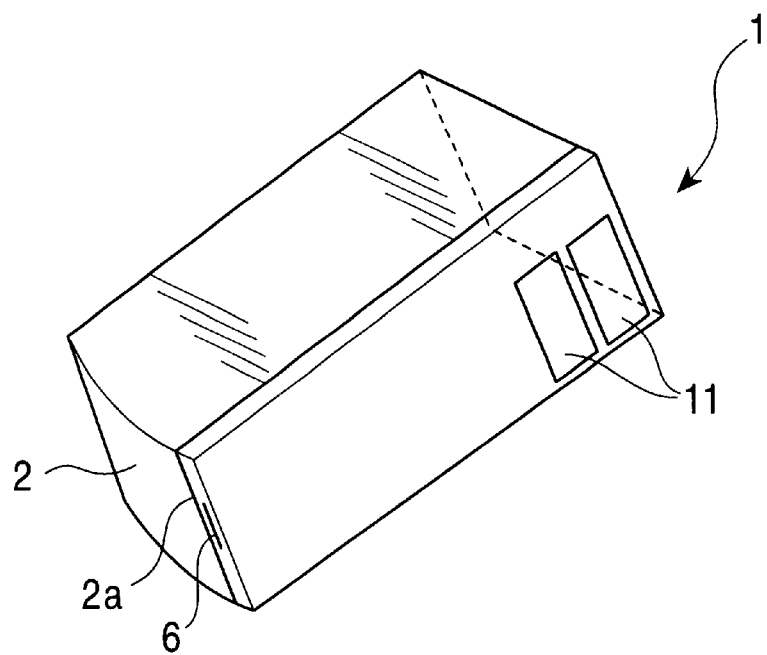
FIG. 2 shows a main part of the MR head according to the present invention.
Figure 3A:
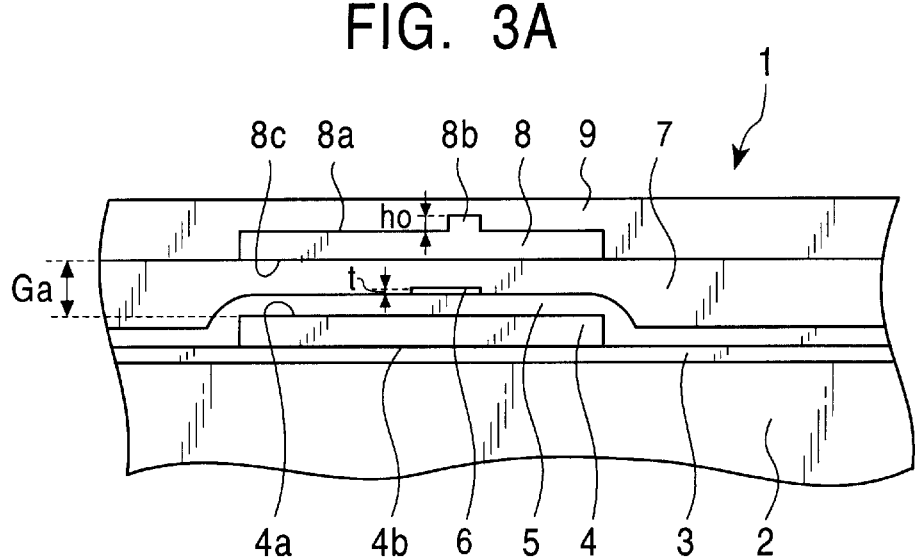
FIG. 3A shows the construction of the MR head according to the present invention.
Figure 3B:
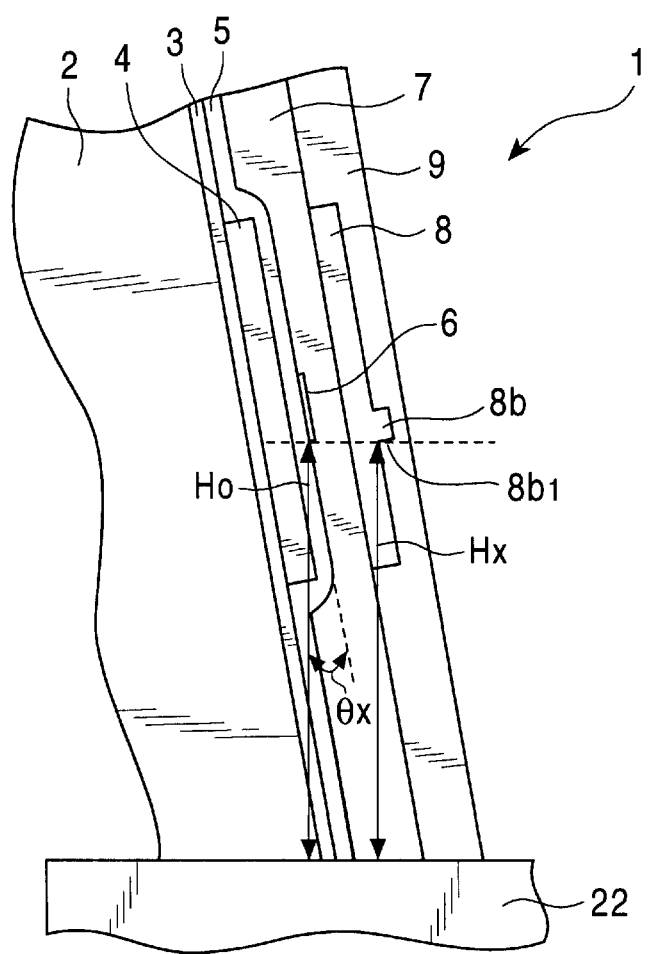
FIG. 3B shows the construction of the MR head according to the present invention.
Figure 4:
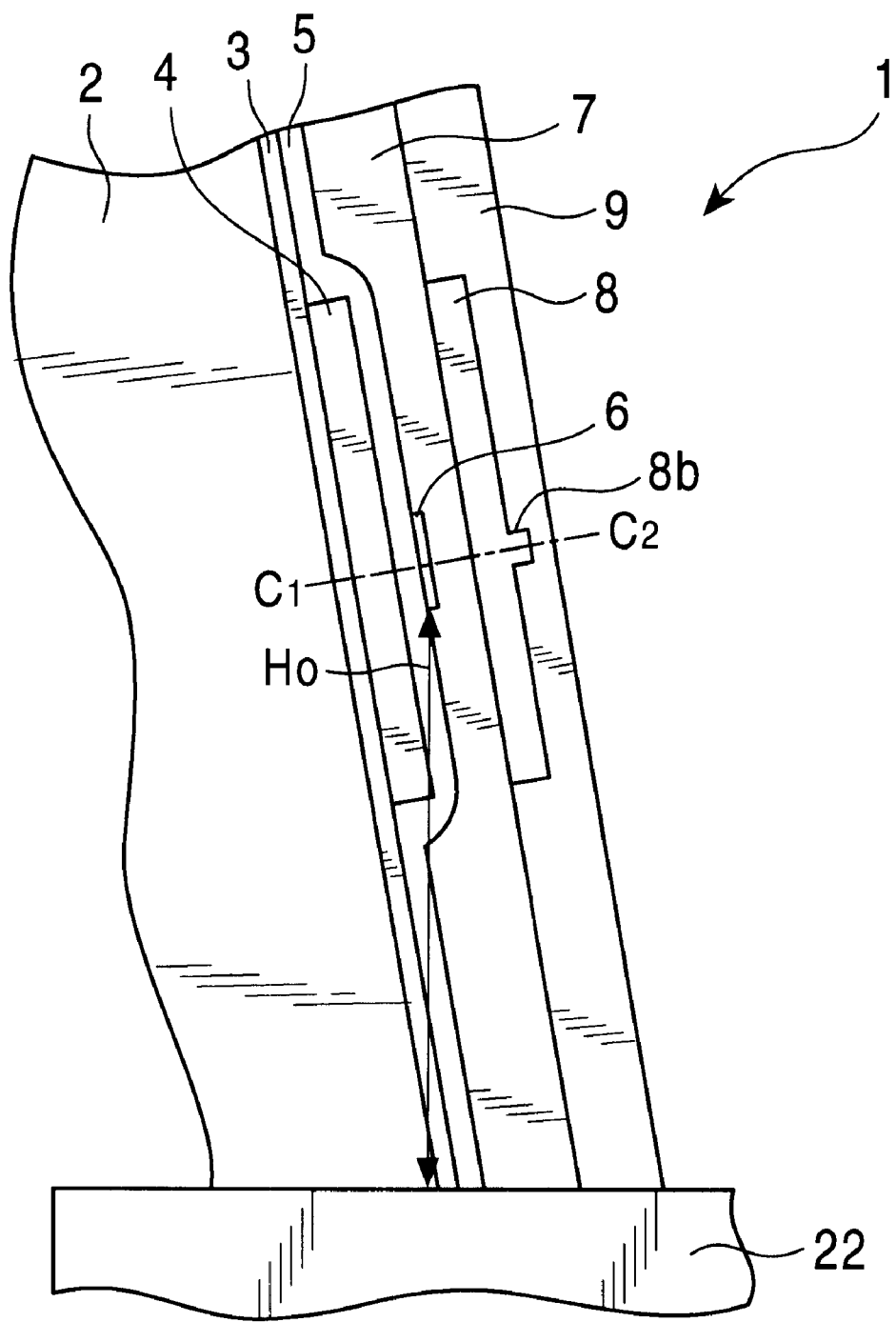
FIG. 4 is a plane view showing another embodiment of the MR head according to the present invention.
Figure 5:
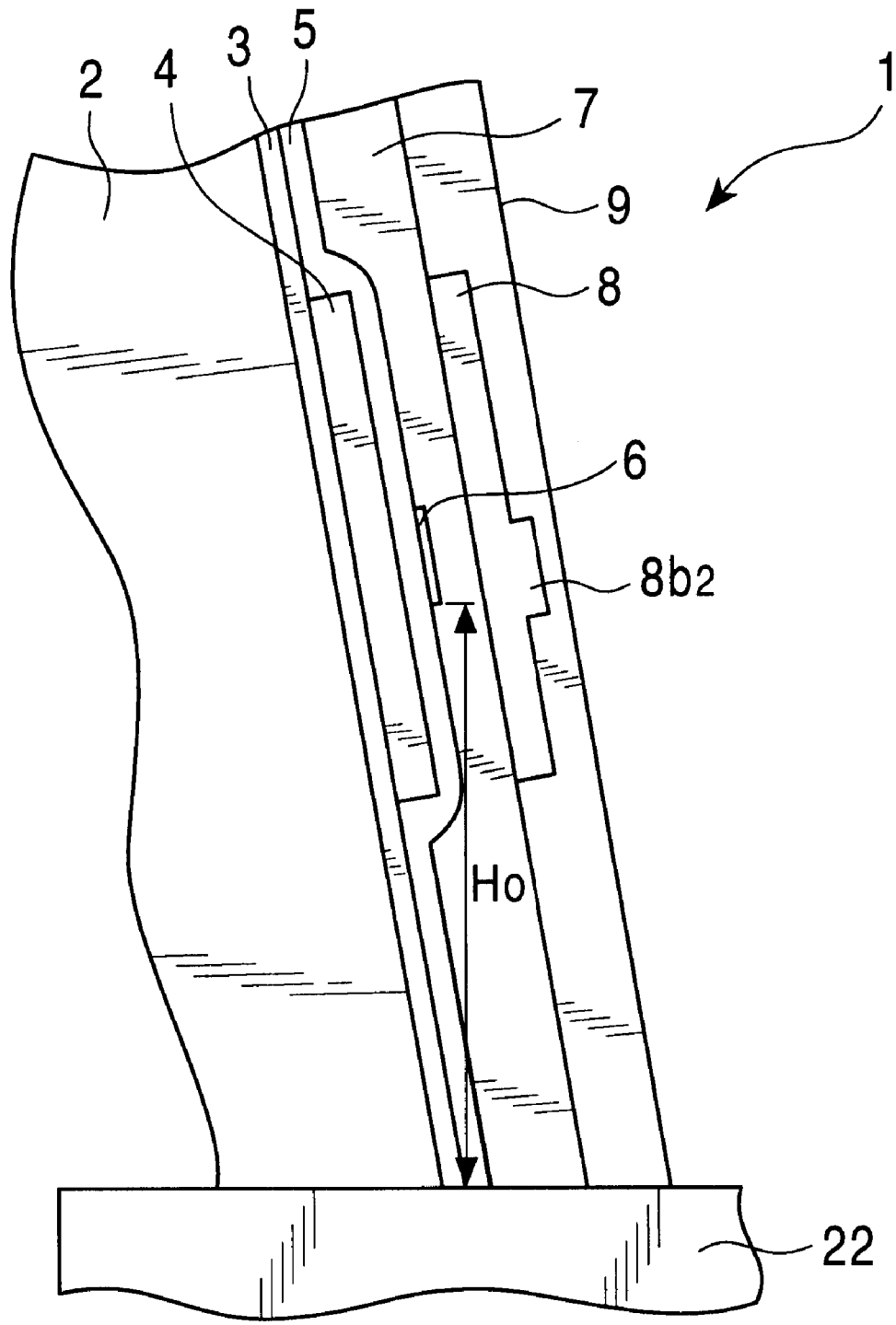
FIG. 5 is a plane view showing a different embodiment of the MR head according to the present invention.
Figure 6:
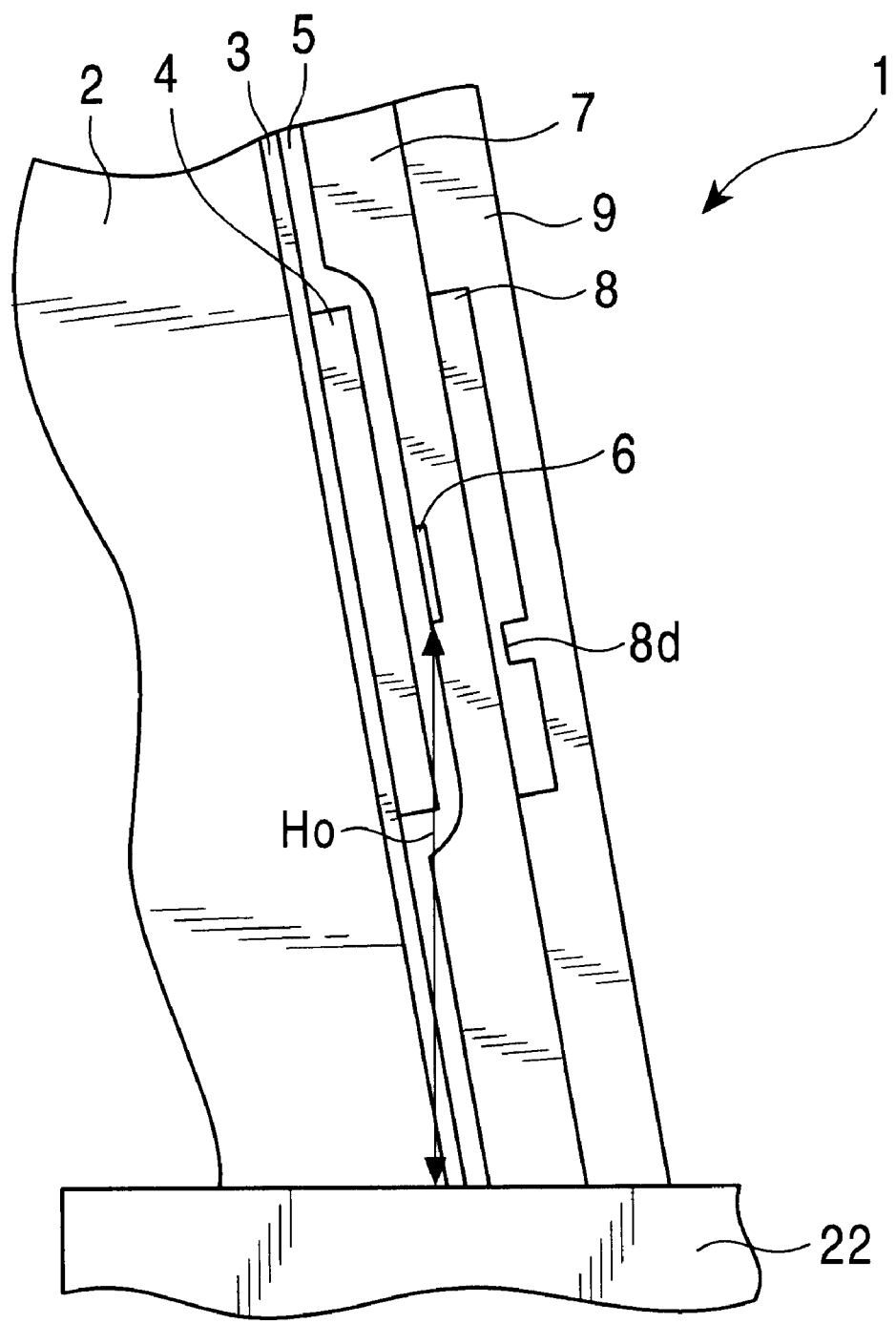
FIG. 6 is a plane view showing a further different embodiment of the MR head according to the present invention.
Figure 7:
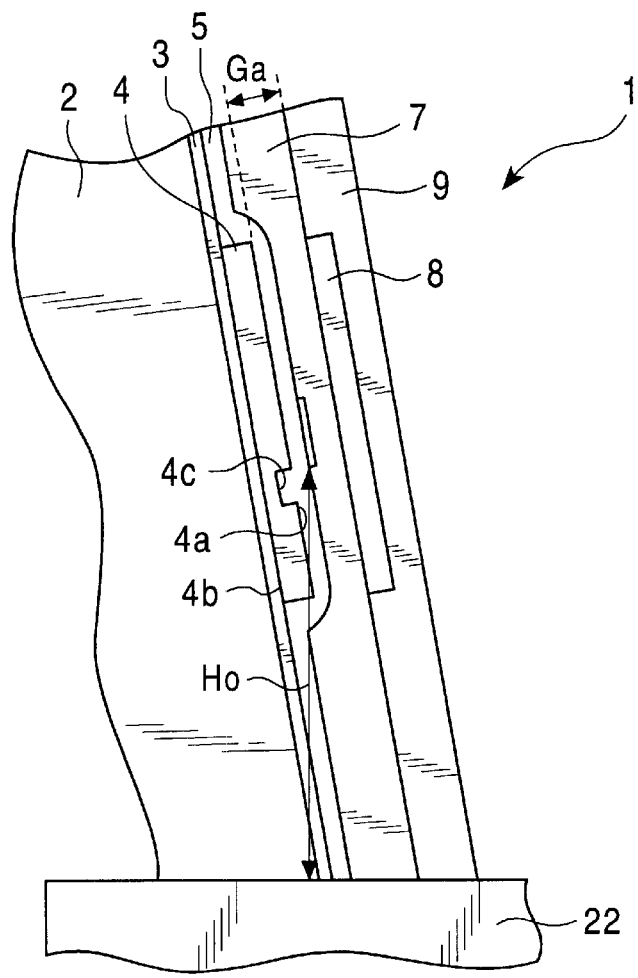
FIG. 7 is a plane view showing a further different embodiment of the MR head according to the present invention.
Figure 8:
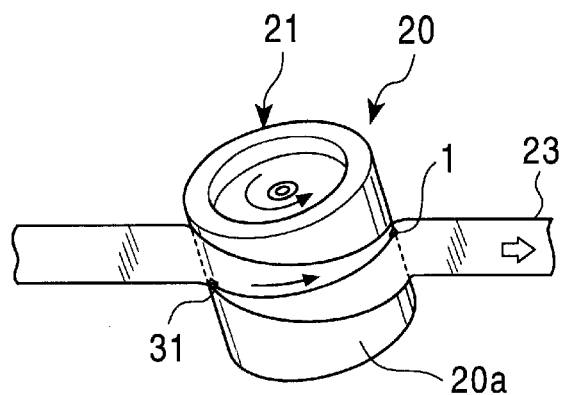
FIG. 8 is a perspective view showing the rotary drum in the helical scan type magnetic recording and reproducing apparatus.
Figure 9:
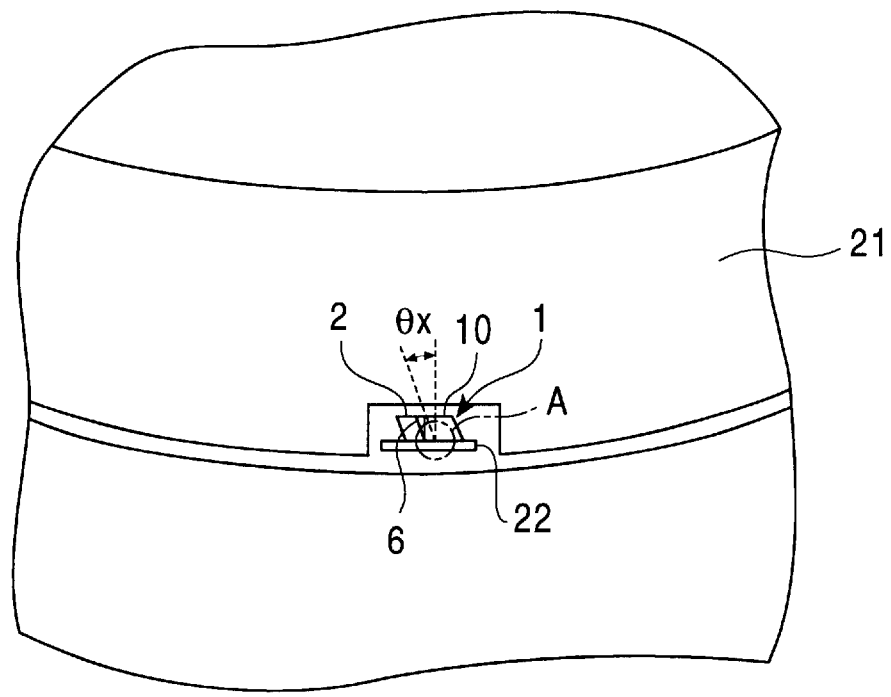
FIG. 9 is a perspective view showing the construction of the MR head according to the present invention mounted on the rotary drum.
Figure 10:
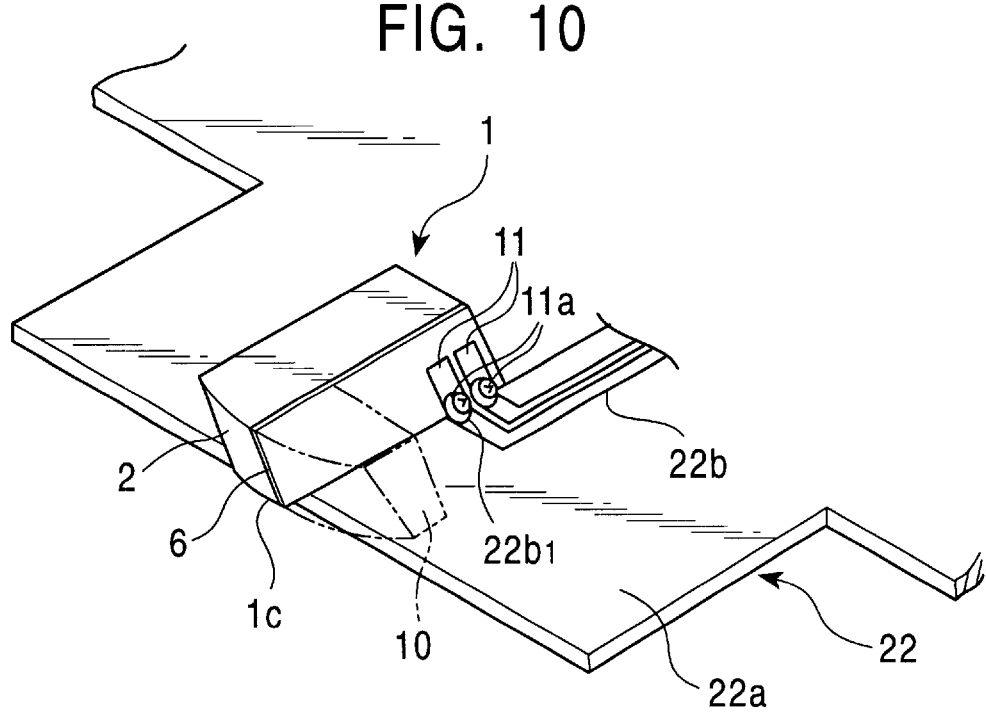
FIG. 10 is a perspective view showing the construction of the MR head according to the present invention mounted on the rotary drum viewed from the sliding face side of the recording medium.
Figure 11:
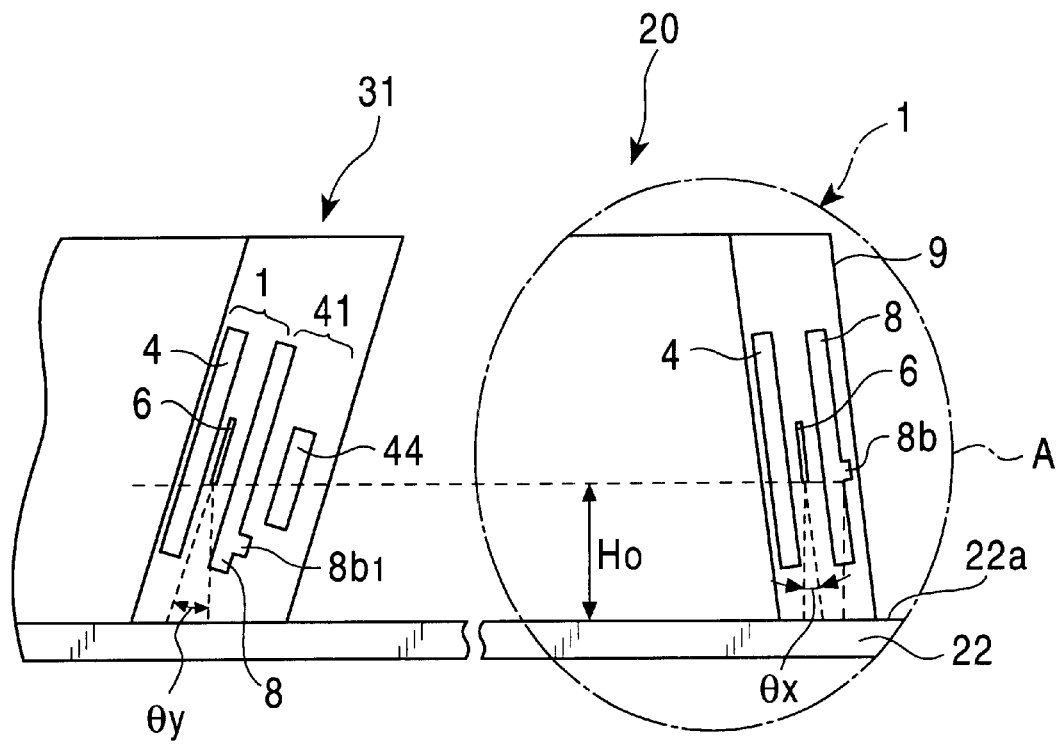
FIG. 11 a plane view of the construction viewed from the sliding face side of the recording medium when the MR head according to the present invention is applied to the helical scan type magnetic recording and reproducing apparatus.
Figure 12:
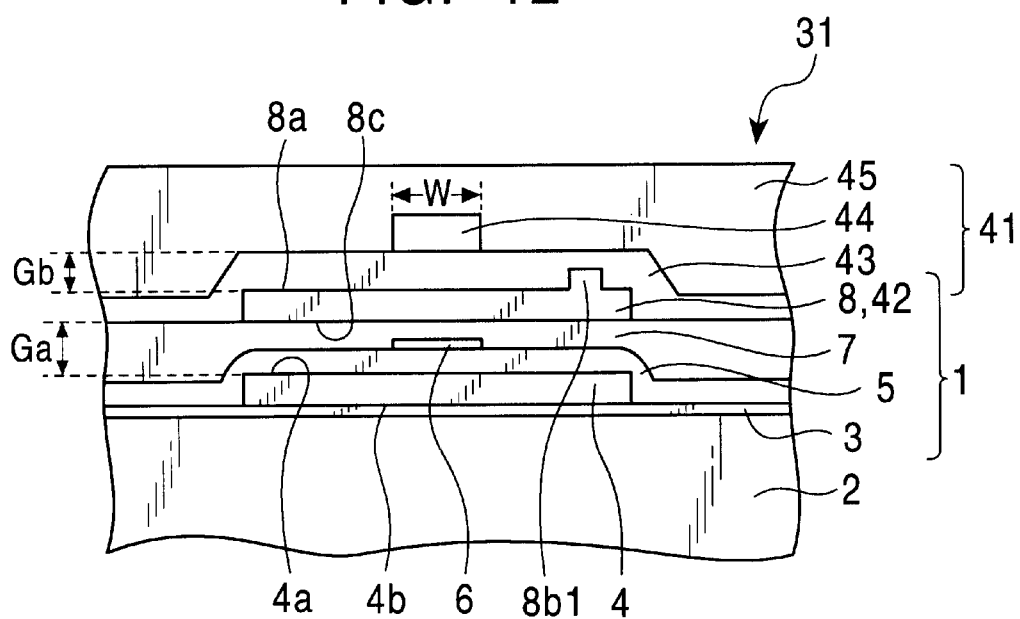
FIG. 12 is a plane view of the construction of the composite type magnetic head manufactured by laminating the recording inductive head on the MR head according to the present invention viewed from the sliding face side of the recording medium.
Figure 13:
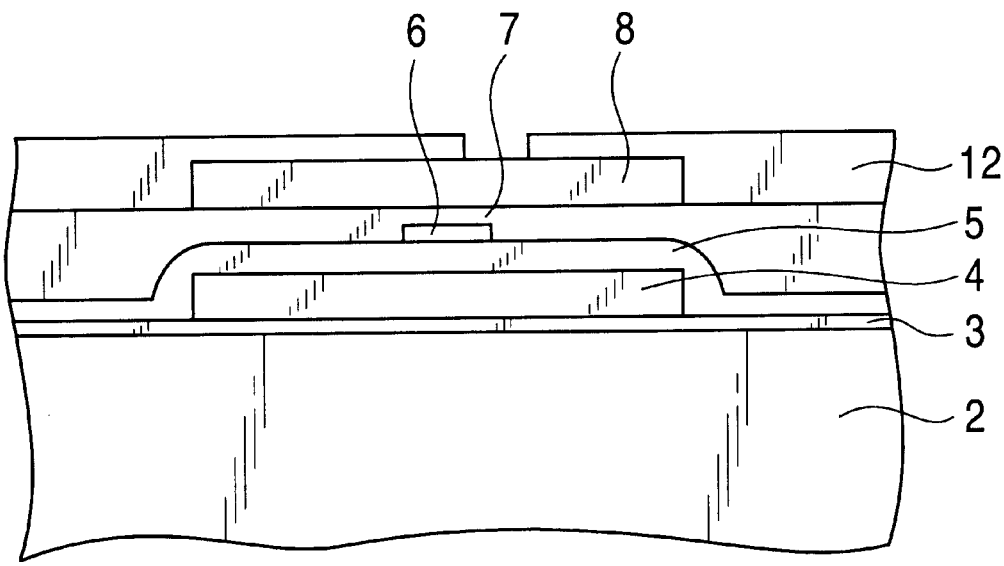
FIG. 13 is a plane view showing one step for forming the convex portion on the upper shield layer of the MR head according to the present invention.
Figure 14:
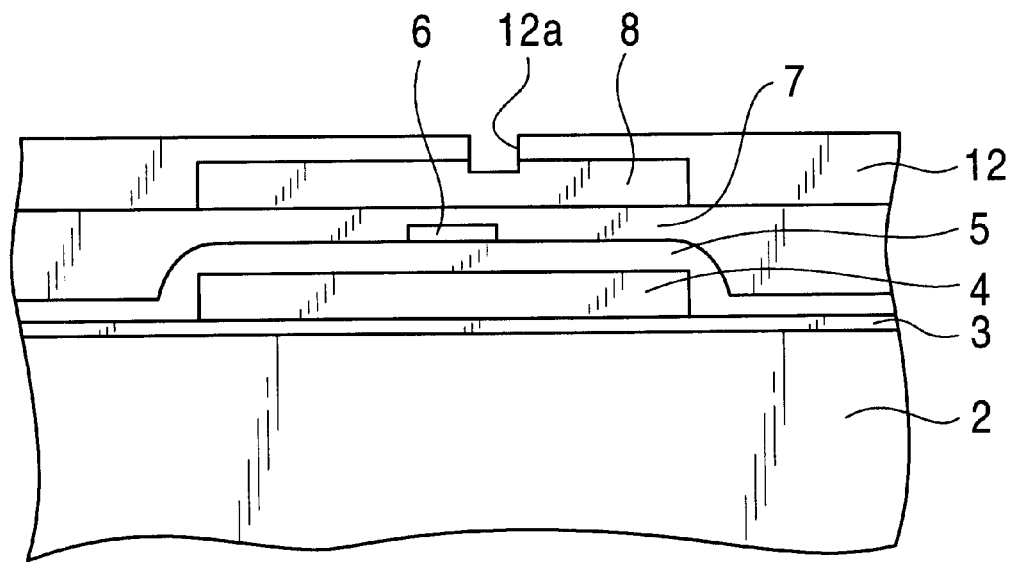
FIG. 14 is a plane view showing one step for forming the convex portion on the upper shield layer of the MR head according to the present invention.
Figure 15:
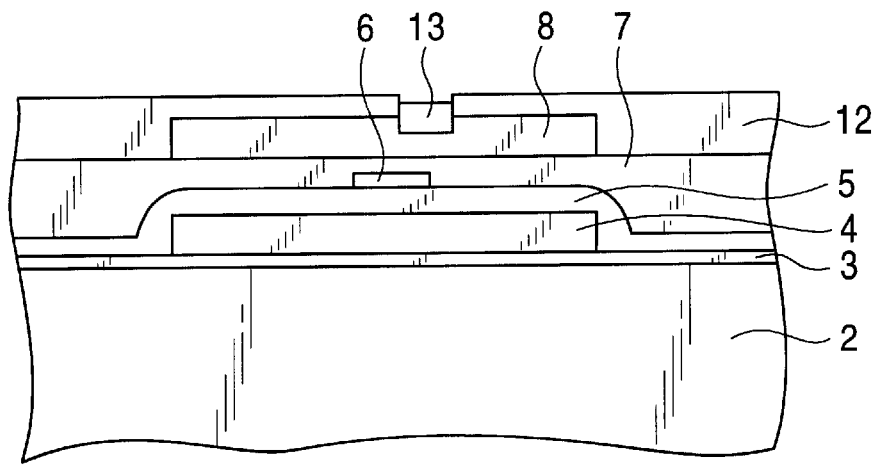
FIG. 15 is a plane view showing one step for forming the convex portion on the upper shield layer of the MR head according to the present invention.
Figure 16:
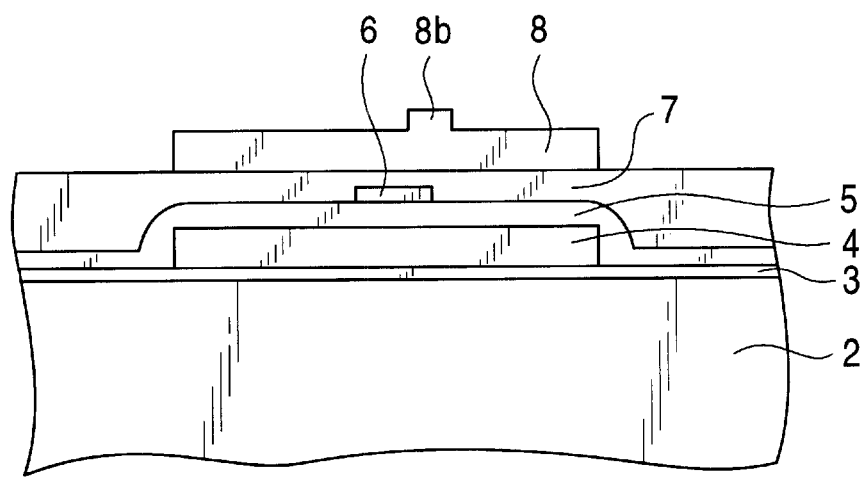
FIG. 16 is a plane view showing one step for forming the convex portion on the upper shield layer of the MR head according to the present invention.
Figure 17:
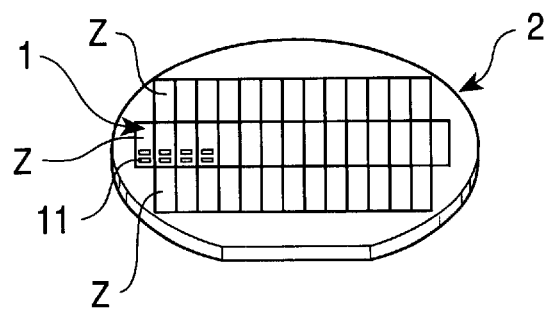
FIG. 17 is a perspective view showing one step for manufacturing the MR head according to the present invention.
Figure 18:
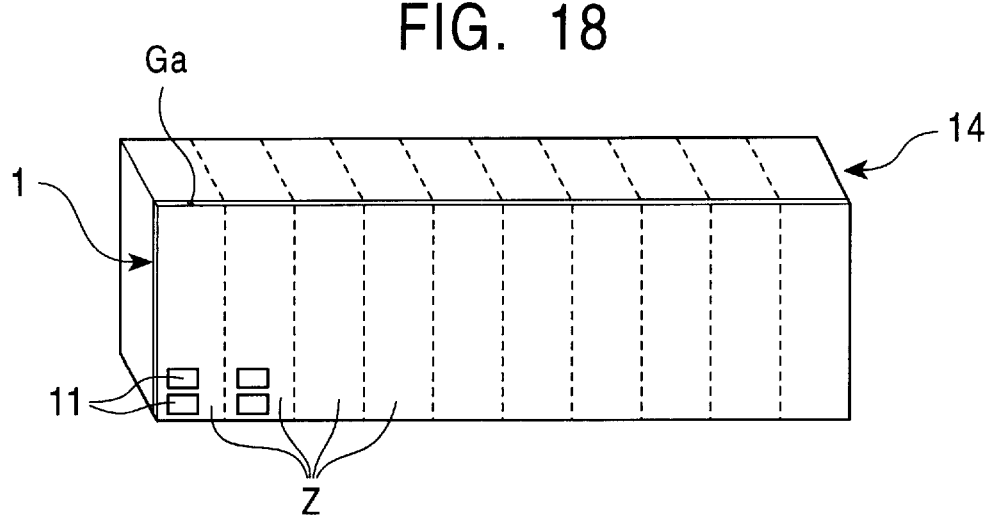
FIG. 18 is a perspective view showing one step for manufacturing the MR head according to the present invention.
Figure 19:
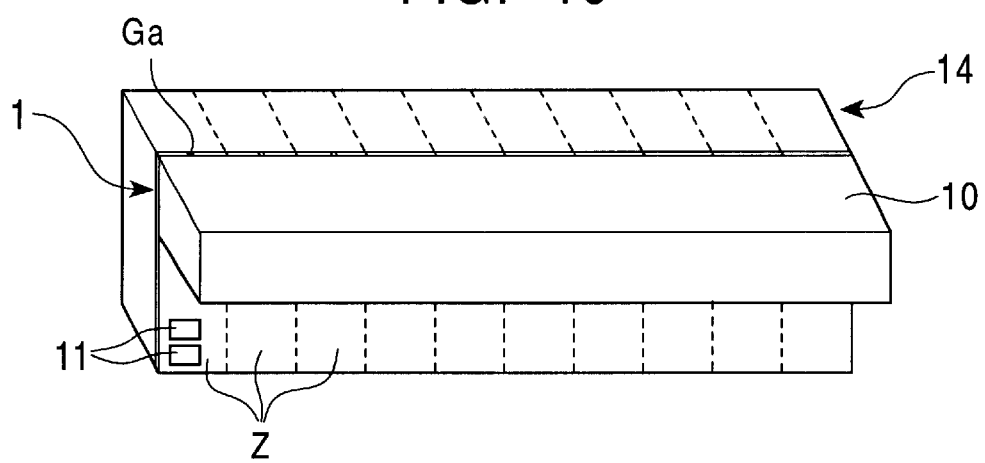
FIG. 19 is a perspective view showing one step for manufacturing the MR head according to the present invention.
Figure 20:
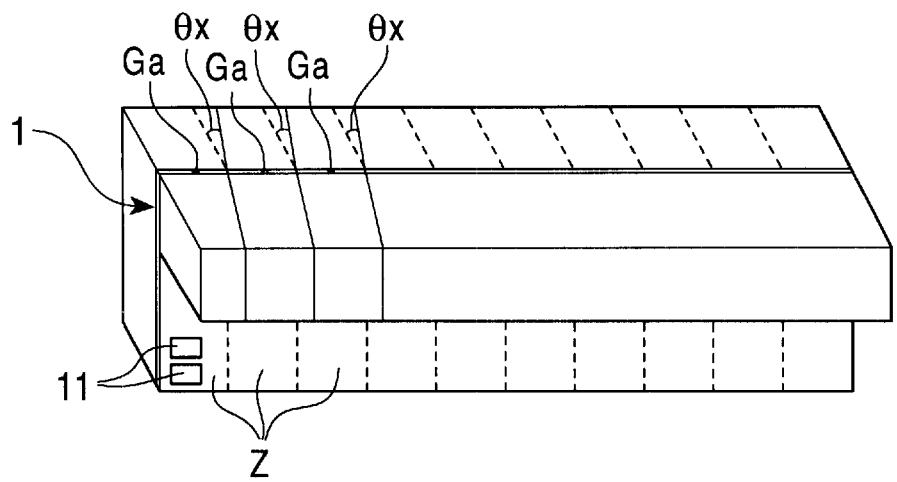
FIG. 20 is a perspective view showing one step for forming an azimuth angle in the method for manufacturing the MR head according to the present invention.
Figure 21:
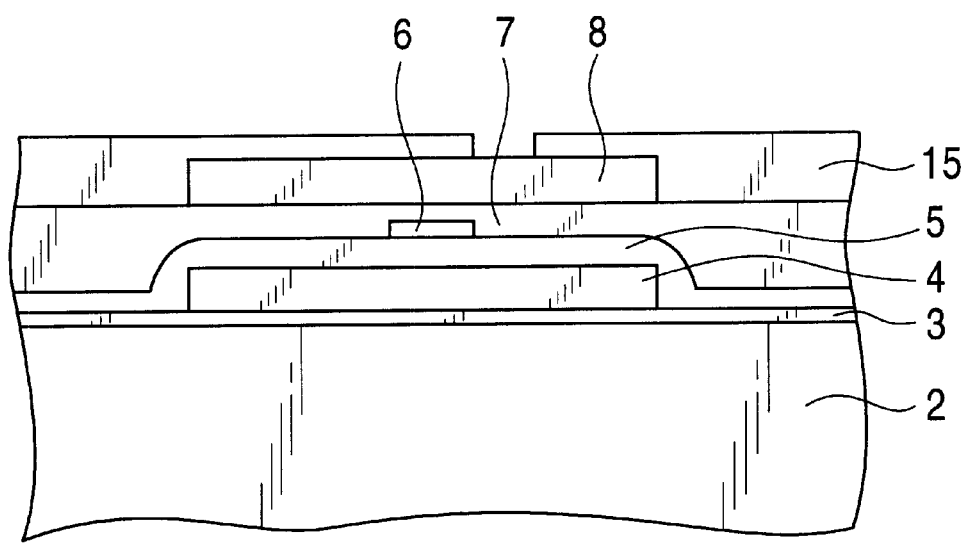
FIG. 21 is a plane view showing one step for forming the convex portion on the upper shield layer of the MR head according to the present invention.
Figure 22:
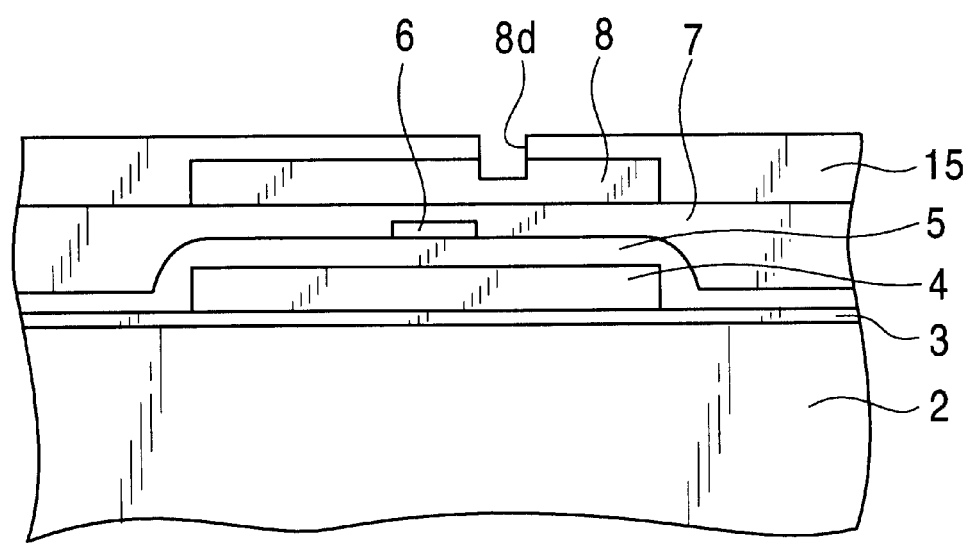
FIG. 22 is a plane view showing one step for forming the convex portion on the upper shield layer of the MR head according to the present invention.
Figure 23:
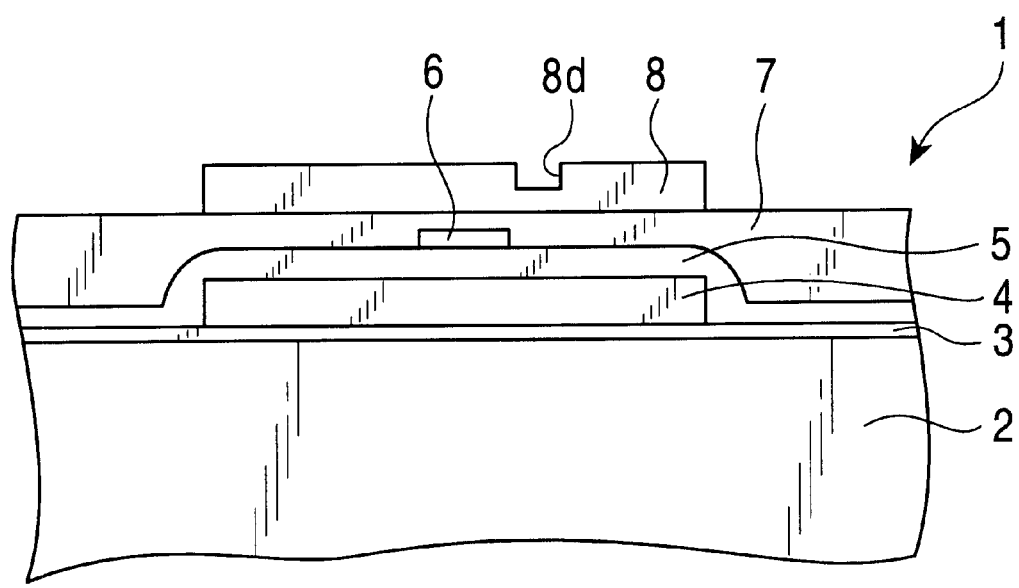
FIG. 23 is a plane view showing one step for forming the concave portion on the upper shield layer of the MR head according to the present invention.
Figure 24:
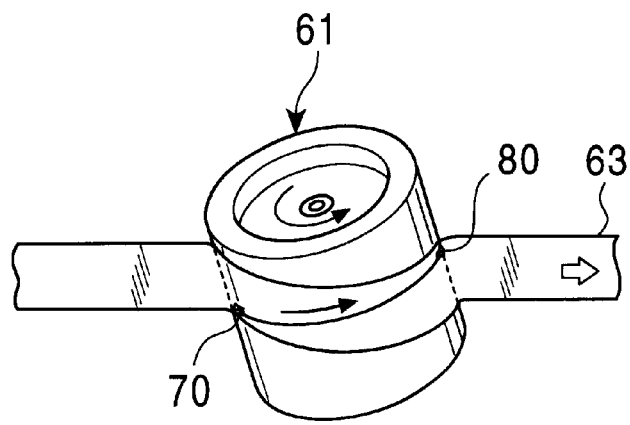
FIG. 24 shows a perspective view of the rotary drum of the conventional helical scan type magnetic recording and reproducing apparatus.
Figure 25:
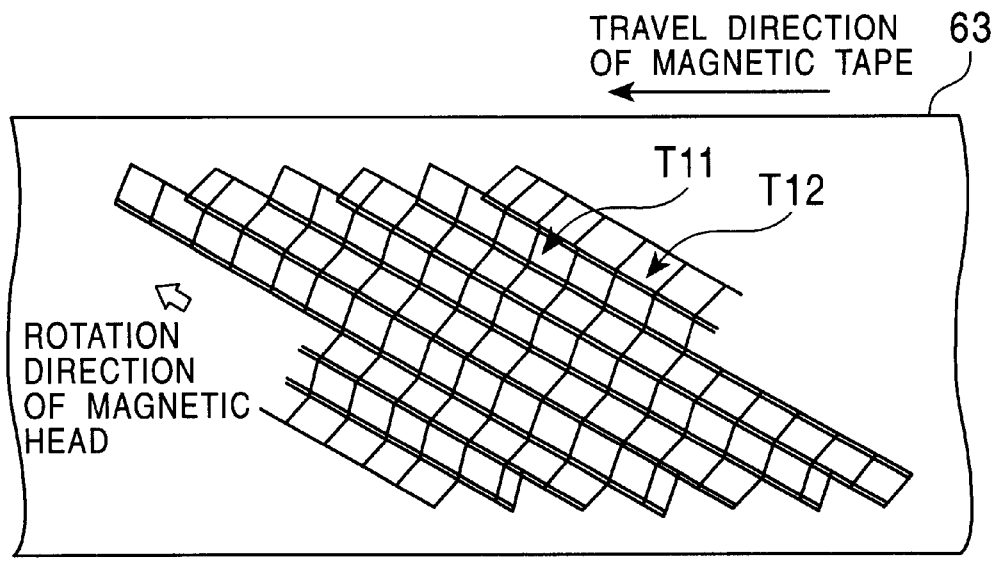
FIG. 25 is a plane view for describing the recording method in the helical scan type magnetic recording and reproducing apparatus.
Figure 26:
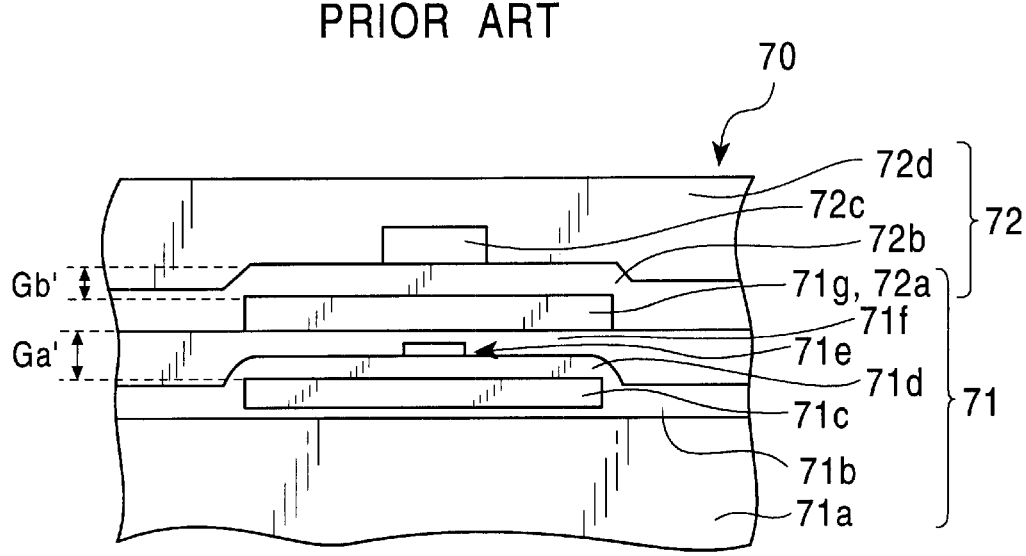
FIG. 26 is a plane view showing the construction of the composite type magnetic head.
Figure 27:
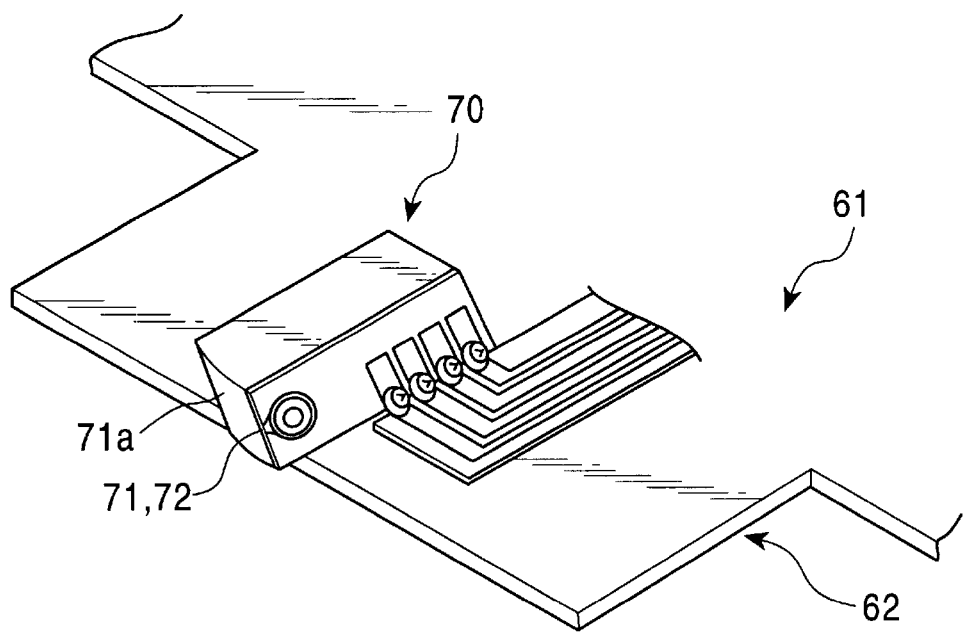
FIG. 27 is a perspective view showing the construction of the magnetic head mounted on the base board of the rotary drum.
Figure 28:
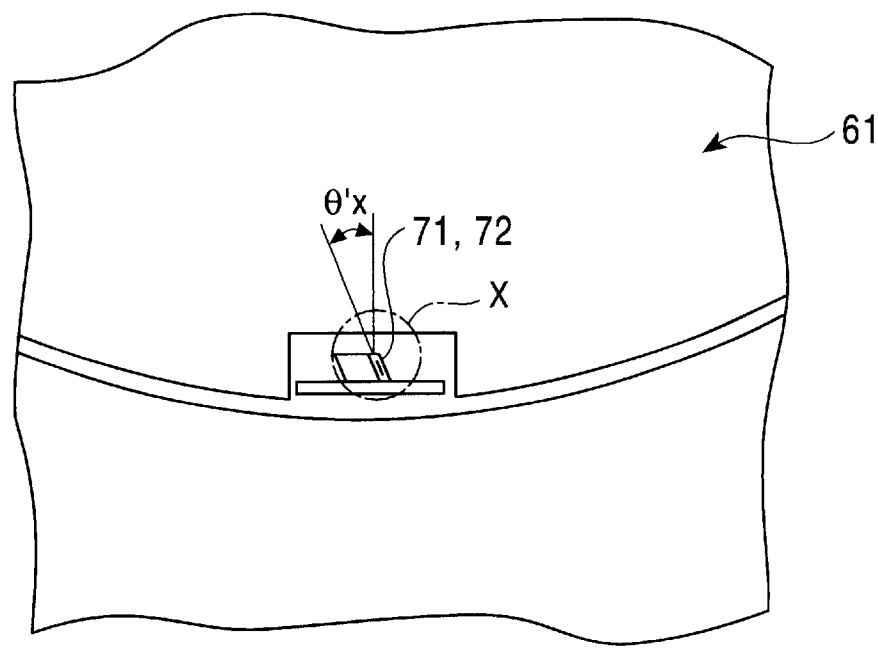
FIG. 28 is a plane view of the construction of the magnetic head mounted on the rotary drum viewed from the sliding face side of the recording medium.
Figure 29:
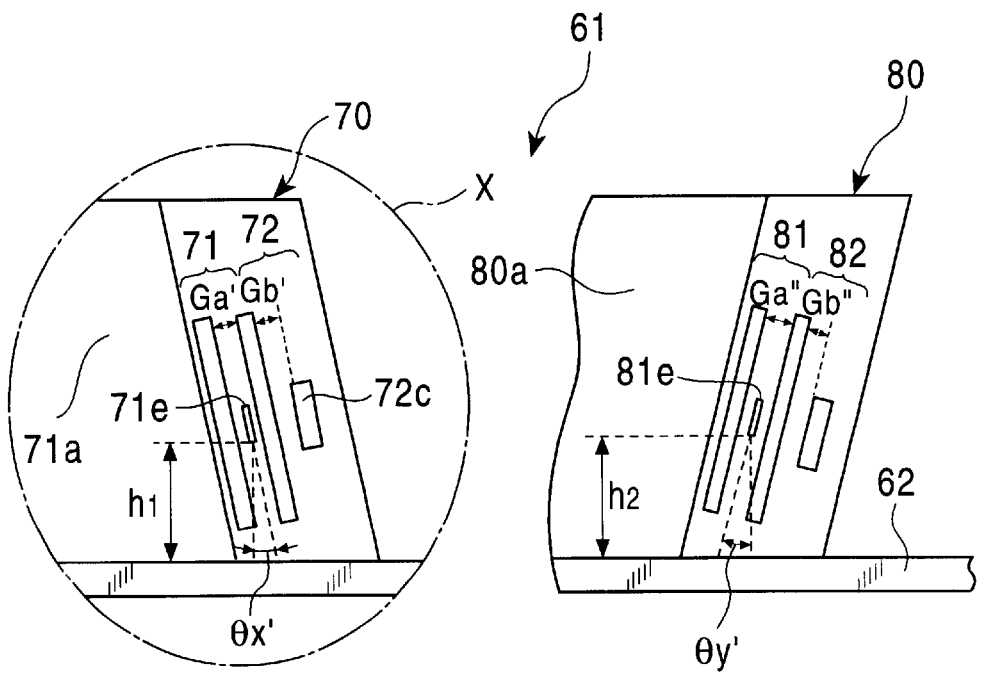
FIG. 29 includes an enlarged construction of the area X in FIG. 28, and shows a plane view for describing the elevation adjustment of respective MR layers of the two magnetic heads.
Figure 30:
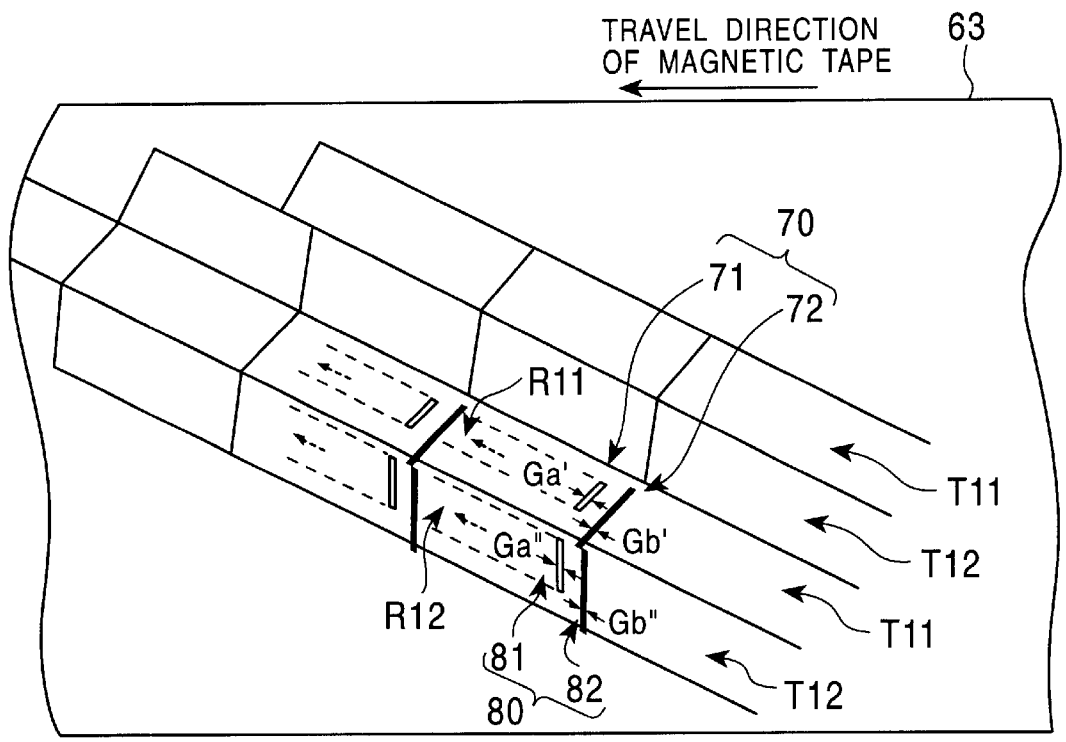
FIG. 30 shows a plane view of the reproduction track during reproduction when respective MR layers of the two magnetic heads have different elevations one another.
Figure 31:
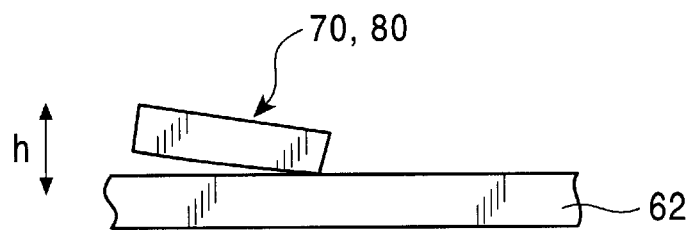
FIG. 31 a plane view showing how mounting errors occur when the magnetic head is mounted on the base board.

A MR head as an application object of the present invention, and embodiments of a rotary head assembly of the helical scan type magnetic recording and reproducing apparatus using the MR head will be described hereinafter with reference to the drawings. FIG. 1 shows a perspective view of the MR head according to the present invention; FIG. 2 shows a main part of the MR head according to the present invention; FIG. 3A shows the construction of the MR head according to the present invention; FIG. 3B shows the construction of the MR head according to the present invention; FIG. 4 is a plane view showing another embodiment of the MR head according to the present invention; FIG. 5 is a plane view showing a different embodiment of the MR head according to the present invention; FIG. 6 is a plane view showing a further different embodiment of the MR head according to the present invention; FIG. 7 is a plane view showing a further different embodiment of the MR head according to the present invention; FIG. 8 is a perspective view showing the rotary drum in the helical scan type magnetic recording and reproducing apparatus; FIG. 9 is a perspective view showing the construction of the MR head according to the present invention mounted on the rotary drum; FIG. 10 is a perspective view showing the construction of the MR head according to the present invention mounted on the rotary drum viewed from the sliding face side of the recording medium; FIG. 11 a plane view of the construction viewed from the sliding face side of the recording medium when the MR head according to the present invention is applied to the helical scan type magnetic recording and reproducing apparatus; FIG. 12 is a plane view of the construction of the composite type magnetic head manufactured by laminating the recording inductive head on the MR head according to the present invention viewed from the sliding face side of the recording medium; FIG. 13 is a plane view showing one step for forming the convex portion on the upper shield layer of the MR head according to the present invention; FIG. 14 is a plane view showing one step for forming the convex portion on the upper shield layer of the MR head according to the present invention; FIG. 15 is a plane view showing one step for forming the convex portion on the upper shield layer of the MR head according to the present invention; FIG. 16 is a plane view showing one step for forming the convex portion on the upper shield layer of the MR head according to the present invention; FIG. 17 is a perspective view showing one step for manufacturing the MR head according to the present invention; FIG. 18 is a perspective view showing one step for manufacturing the MR head according to the present invention; FIG. 19 is a perspective view showing one step for manufacturing the MR head according to the present invention; FIG. 20 is a perspective view showing one step for forming an azimuth angle in the method for manufacturing the MR head according to the present invention; FIG. 21 is a plane view showing one step for forming the convex portion on the upper shield layer of the MR head according to the present invention; FIG. 22 is a plane view showing one step for forming the convex portion on the upper shield layer of the MR head according to the present invention; and FIG. 23 is a plane view showing one step for forming the concave portion on the upper shield layer of the MR head according to the present invention.

The MR head 1 according to the present invention corresponds to a thin film magnetic head that is favorably used in the helical scan type magnetic recording and reproducing apparatus such as a VTR and a data recording and reproducing unit for a computer using a magnetic head as a recording medium.

The MR head 1 comprises a lower shield layer 4, a lower gap layer 5, a MR layer 6, an upper gap layer 7, an upper shield layer 8 and an insulation layer 9 as a protective layer formed by sequentially laminating them on one side face 2a of a rectangular parallelpiped base board 2 via an insulation layer 3 as a substrate layer by a thin film deposition process as shown in FIGS. 1, 2 and 3A. A protective plate 10 is joined in abutting relation to the insulation layer 9 so that the MR layer 6 is inserted between the protective plate and one side face 2a of the substrate 2. Two bonding pads 11 on which pull-out electrodes (not shown) are pulled out are also formed on one side face 2a of the substrate 2.

The portion sandwiched between the lower shield layer 4 and upper shield layer 8 serves as a read magnetic gap Ga of the MR head 1. The MR head 1 has a tape slide face 1a comprising the end face 2b of the substrate 2 and the side face 10a of the protective plate 10 formed into a curved surface, and the read magnetic gap Ga is exposed on the tape slide face 1a. The magnetic field passing through the magnetic gap Ga from recorded signals on the magnetic tape is sensed by the MR layer 6. While the hard bias layer and electrode layer are omitted in the drawing, they are formed on the lower gap layer 5.

The substrate 2 is formed of a non-magnetic material such as alumina titanium carbide ($Al_2O_3 \cdot TiC$). The substrate is a supporting board on one side face 2a of which the insulation layer 3 is formed and one end face 2b of which serves as a slide face of a recording medium. The insulation layer 3 as a substrate layer comprises an insulation material such as alumina ($Al_2O_3$) and $SiO_2$. The lower shield layer 4 and the upper shield layer 8 comprise a magnetic material such as polycrystalline ferrite including Sendust, Ni—Fe ferrite based alloy (permalloy) and Ni—Zn hematite. The lower gap layer 5 and the upper gap layer 7 constituting a part of the magnetic gap Ga comprises a non-magnetic material such as alumina ($Al_2O_3$). The MR layer 6 is formed on the lower gap layer 5 by sequentially laminating, for example, a soft magnetic layer (a SAL layer), a non-magnetic layer (a SHUNT layer) and a magnetoresistive layer (a MR film) in this order from the bottom to the top. The magnetoresistive layer, the non-magnetic layer and the soft magnetic layer comprise the Ni—Fe based alloy (permalloy), Ta (tantalum) and a Ni—Fe—Nb based alloy, respectively. The magnetic gap Ga is composed of the lower gap layer 5, the MR layer 6 and the upper gap layer 7. The insulation layer 9 that serves as a protective layer is composed of an insulation material like the insulation layer 3.

As shown in FIG. 3A, a convex portion 8b is formed on the upper shield layer 8 at the position opposed to the MR layer 6 on one principal face 8a. In more detail, the convex portion 8b is provided so that the distance from its end portion 8b1 to the base substrate 22, or the elevation $H_x$ of the convex portion 8b, is approximately equal to the distance from the end portion 6a of the MR layer 6 to the base board 22, or the desirable elevation $H_0$ of the MR layer 6, as shown in FIG. 3b when the magnetic head 1 is mounted on the base board 22 with an azimuth angle of àx.

The elevation $h_0$ of the convex portion 8b is far more larger than the film thickness t of the MR layer 6, which has a dimension distinguishable with an optical microscope. The film thickness t of the MR layer 6 is about 600 angstrom.

The elevation of the MR layer 6 can be directly specified by distinguishing the convex portion 8b, when the convex portion 8b is formed at a site having an approximately the same dimension as the desired elevation $H_0$ of the MR layer 6 on the upper shield layer 8. Therefore, the magnetic head 1 can be mounted on the base board 22 so that the MR layer 6 is positioned at a desired elevation $H_0$ by distinguishing the convex portion 8b. In other words, it can be directly judged whether the MR layer 6 after manufacturing is positioned at a desired elevation $H_0$ or not by merely distinguishing the convex portion 8b.

It is also preferable that the convex portion 8b1 is provided at a position where the center line C1 of the MR layer 6 coincides with the center line C2 of the convex portion 8b as shown in FIG. 4. As a result, the center of the MR layer 6 can be specified with reference to the position of the convex portion 8b.

It is further preferable that the convex portion 8b2 as a marker is formed to have an approximately the same width as the longitudinal width on the sliding face of the recording medium of the MR layer 6 as shown in FIG. 5. As a result, the position of the MR layer 6 can be more easily specified.

The convex portion 8b2 may be provided not only at the positions shown in FIGS. 3 to 5, but also at a position where a prescribed positional relation is maintained between the convex portion and the MR layer 6. This means that the position of the MR layer 6 may be specified based on the positional relation as described above by distinguishing the convex portion 8b using an optical microscope, when the convex portion 8b is provided at a position having a prescribed positional relation with the MR layer 6.

The marker may have any shape provided that it has a dimension distinguishable with an optical microscope. The marker is not restricted to the convex portion 8b, but may be a step comprising continuous convex portions, a concave portion 8d as shown in FIG. 6, or a groove comprising a continuous concave portions.

Alternatively, The convex portion 8b may be formed not only on the upper shield layer 8 but also on the lower shield layer 4. In other words, the convex portion may be formed on either one of the principal faces 4a and 4b, and 8a and 8b on the upper shield layer 8 and lower shield layer 4, respectively, provided that the convex portion 8b is formed with a clear positional relation relative to the MR layer 6. However, a concave portion 4c can be more easily formed than the convex portion as a marker on the principal face 4a of the lower shield layer 4 as shown in FIG. 7, because the lower gap layer 5 is thinner than the upper gap layer 7 and the insulation layer 9.

The MR head 1 according to the present invention so constructed as described above is mounted on a rotary head assembly of the helical scan type magnetic recording and reproducing apparatus.

A rotary drum 21 being coaxial with a stationary drum 20a is supported on the stationary drum 20a to be able to freely rotate, and the rotary drum 21 is driven to rotate along the arrow in FIG. 8 as shown in FIG. 8 by a motor power not shown in the drawing in the rotary head assembly 20 of the helical scan type magnetic recording and reproducing apparatus. A plurality of thin film magnetic heads are mounted on the outer circumference face of the rotary drum 21 of this rotary head assembly 20. The magnetic tape 23 as a magnetic recording medium runs toward the direction indicated by an arrow in the drawing with a helical trajectory wound with a prescribed angle around the rotary head assembly 20. The rotary drum 21 rotates while the tape is running, and plural thin film magnetic heads mounted on the rotary drum 21 scans on the magnetic tape 23.

The MR head 1 is disposed on the surface 22a of the base board 22 attached on the outer circumference face of the rotary drum 21 as shown in FIGS. 9 and 10, so that the sliding face 1c of the recording medium is exposed on the outer circumference of the rotary head assembly 20. A composite type magnetic head 31 composed of both of recording inductive heads and reproducing MR heads is mounted on the rotary head assembly 20 besides the MR head 1.

A circuit board 22b such as a flexible printed wiring board is also provided on the base board 22, and the terminal portion 22b1 is bonded to a bonding pad 11 via a ball 11a formed by a ball bonding method. The rotary head assembly 20 is not necessarily restricted to a type in which two thin film heads are mounted at the positions opposed one another as shown in FIG. 8, but three or more of the thin magnetic heads may be mounted. The plural thin magnetic heads mounted on the rotary head assembly 20 may be composed of a type comprising only the composite type magnetic head, a type comprising independently mounted recording inductive heads and reproducing MR heads, or a type comprising a mixed type of the composite type magnetic heads and the MR heads.

The convex portion 8b that serves as a marker for specifying the MR layer 6 is formed at a position being in a prescribed positional relation with the MR layer 6 on one principal face 8a of the upper shield layer 8 in the MR head 1 according to the present invention. Accordingly, the location of the MR layer 6 can be specified in the present invention based on the prescribed positional relation relative to the location of the convex portion 8b, by distinguishing the convex portion 8b using an optical microscope. Consequently, the MR head 1 may be attached on the surface 22a of the base board 22 to mount it on the rotary drum 21 so that the elevation from the base board 22 to the end of the MR layer 6 is adjustable to be equal to a desired elevation $H_0$ as shown in FIG. 11, besides enabling the MR head to be confirmed whether it is attached at a desired elevation $H_0$.

When the composite type magnetic head is used as a thin film head 31 to be mounted on the rotary head assembly 20, it is preferable to use a composite type magnetic head constructed by forming the recording inductive type magnetic head 41 on the MR head 1 according to the present invention as shown in FIGS. 11 and 12.

The thin film magnetic head 31 comprises the recording inductive type magnetic head 41 formed on the MR head 1. The inductive head 41 is formed by sequentially laminating the lower core layer 42 and the insulation layer 44 that also serves as a protective layer on the lower core layer 42 that is also used for the upper shield layer 8 via the gap layer 43 as shown in FIG. 12. The writing magnetic gap Gb comprises a portion sandwiched between the lower core layer 42 and the upper core layer 44. The coil layers not shown in the drawing are formed at both sides of the upper core layer 44.

The gap layer 43 is made of an insulation material such as alumina ($Al_2O_3$) and $SiO_2$. The upper core layer 44 is formed of a plated soft magnetic material such as permalloy.

The convex portion 8b1 formed on the principal face 8a of the upper shield layer 8 in the MR head 1 is preferably provided at a position in a prescribed positional relation with the MR layer 6, as well as at a position out of the area W opposed to the upper core layer 44 forming the write magnetic gap Gb, in order to avoid the effect on the magnetic gap Gb due to the presence of the convex portion 8b1. While the convex portion 8b1 that serves as a marker may be formed on either one of the other principal faces 8a and 8c, and 4a and 4c of the upper shield layer 8 and lower shield layer 4, respectively, in the case of the composite type magnetic head, it is preferable that the convex portion is formed at a position being out of the area W opposed to the upper core layer 44 on any of the principal faces, in order to avoid the effect on the magnetic gap Gb.

The MR head 1 having the construction as described above is manufactured as follows.

The element portion of the MR head 1 is manufactured through the following steps. The insulation layer 3 as a substrate layer comprising an insulation material is at first deposited by sputtering on the substrate 2 comprising a non-magnetic material. Then, the lower shield layer 4 comprising a magnetic material is formed on the insulation layer 3 by plating, followed by sequentially laminating the lower gap layer 5 and the MR layer 6 comprising non-magnetic materials by sputtering. The MR layer 6 is machined by milling after being patterned by a photolithographic technique using a photoresist, and is formed into a tablet shape by the step for peeling the photoresist. The hard layer not shown in the drawing is processed into a desired shape through the steps of film deposition, patterning by photolithography, milling processing and resist peeling prior to the steps for depositing the MR layer as a thin film followed by patterning. After processing the MR layer 6 into a tablet form, an electrode material is deposited by sputtering on the MR layer 6 and lower gap 5 to form pullout electrodes (not shown) through the steps of patterning, milling of the electrode material, and peeling of the resist. The upper gap layer 7 comprising a non-magnetic material is formed by sputtering thereon, and the upper shield layer 8 is formed on the upper gap layer 7 as a thin film by plating.

A photoresist 12 is deposited by photolithography on the flat face of the upper shield layer 8 formed by plating as shown in FIG. 13, and the photoresist is patterned by using a photolithographic apparatus so that the site for providing the convex portion 8b is machined into a concave shape thereafter. Then, a milling process is applied by using the patterned photoresist as a mask to form a concave portion 12a at a position to be provided with the convex portion 8b as shown in FIG. 14.

In the next step, plating layers 13 are formed by plating on the photoresist left behind after patterning and on the concave portion 12a using the same magnetic material as used for the upper shield layer 8 as shown in FIG. 15.

The upper shield layer 8 on which the convex portion 8b as shown in FIG. 6 is left behind is obtained by peeling the photoresist left behind after patterning with a solvent.

Then, the insulation layer 9 is deposited as a thin film on the upper shield layer 8 by sputtering using an insulation material, thereby obtaining the element part of the MR head 1 as shown in FIG. 3.

A plurality of the thin film elements Z comprising the element part of the MR head 1 formed as described above and two bonding pads 11 provided on the element part of the MR head 1 are arranged as a matrix on the substrate 2 as shown in FIG. 17.

A bar 14 is formed thereafter as shown in FIG. 18 so that each exposure face on which magnetic gaps Ga on the MR layer 6 of the MR head 1 is exposed is arranged in parallel one another. Each dotted line in the drawing shows a boundary between the areas of respective units.

In the next step, rectangular parallelpiped protective plates 10 comprising a non-magnetic material such as alumina titanium carbide are bonded to plural element parts of the MR head 1 as shown in FIG. 19 so as to expose the two bonding pads 11, followed by adhering the plate with an adhesive material such as an adhesive comprising a resin.

Then, the bar 14 is cut for every thin film elements Z together with the protective plate 10. The cut direction is made to be slanted by an azimuth angle àx from the boundary as shown by the solid line in the drawing. The cut-face serves as a face 2a on which the MR layer 6 and the like of the substrate are formed. The azimuth angle àx of the MR layer 6 is determined by only cutting the bar 14. A tape slide face 1c with a smoothly curved face is formed by processing the side face 2 of the substrate 2 and the side face 10a of the protective plate 10 through polishing and cutting steps.

The MR head 1 according to the present invention as shown in FIG. 1 to 3 is manufactured by the steps as described above. The convex portion 8b is formed on one principal face 8a of the upper shield layer 8, and the convex portion 8b serves as a marker for specifying the location of the MR layer 6. Accordingly, whether the MR layer 6 is formed at a desired position or not, or whether the elevation of the end of the MR layer 6 is equal to the elevation $H_0$ or not, is detectable in the MR head 1 according to the present invention by distinguishing the convex portion 8b with an optical microscope, even when dimensional errors of cutting are caused in the cutting step for providing the azimuth angle àx in the steps as hitherto described. A plurality of the magnetic heads having the same elevation of the MR layers 6 one another specified by the convex portion 8b can be selectively paired to mount on the base board 22.

It is also made possible to judge whether the elevation of the MR layer 6 is equal to the desired elevation $H_0$ or not, or whether the mounting errors exist or not, when the MR head 1 is mounted on the base board 22, by distinguishing the convex portion 8b using an optical microscope as described above in the MR head 1 according to the present invention, thereby enabling the elevation after mounting to be further adjusted.

The manufacturing method for providing a concave portion 8d as a marker on the upper shield layer will be described hereinafter. The steps until the upper shield layer 8 processed to have a flat face is formed are the same as the steps as hitherto described. A photoresist 15 is deposited on the upper shield layer 8 as shown in FIG. 21 using a photolithographic technique, and the photoresist is patterned thereafter using a photolithographic apparatus so that the site for providing the concave portion 8d is formed into a concave portion. Then, a milling processing is applied using the patterned photoresist as a mask to form the concave portion 8d on the upper shield layer 8 as shown in FIG. 22. The upper shield layer 8 on which the concave portion 8d is formed as shown in FIG. 23 is obtained by peeling the photoresist 15 left behind after pattering with a solvent. The element part of the MR head 1 as shown in FIG. 6 is obtained thereafter by depositing a insulation layer 9 on the upper shield layer 8 by sputtering using an insulation material.

At least either the convex portion or the concave portion is provided on the principal face of the shield layer in the thin film magnetic head according to the present invention, and at least either the convex portion or the concave portion is provided at the site with a prescribed positional relation with the magnetoresistive layer, which serves as a marker for specifying the magnetoresistive layer. Accordingly, the location of the magnetoresistive layer can be specified by distinguishing the marker.

It is made possible according to the thin film magnetic head in the present invention to adjust the mounting elevation of each magnetoresistive layer based on the position of the marker, when a plurality of the magnetoresistive layers are mounted on the magnetic recording and reproducing apparatus.

Consequently, the present invention provides a thin film magnetic head having excellent recording and reproducing characteristics with sufficient adaptability for high density recording, when the magnetic head is mounted on the helical scan type magnetic recording and reproducing apparatus.

What is claimed is:

1. A thin film magnetic head mounted on a helical scan type magnetic recording and reproducing apparatus comprising a lower shield layer made of a magnetic material formed on a substrate, a lower gap layer made of a non-magnetic material formed on the lower shield layer, a magnetoresistive layer formed on the lower shield layer via the lower gap layer, an upper gap layer made of a non-magnetic material formed on the magnetoresistive layer, and an upper shield layer made of a magnetic material formed on the magnetoresistive layer via the upper gap layer, wherein either a convex portion or a concave portion is provided on at least one principal face of the upper shield layer, a height of the convex portion or a depth of the concave portion of at least either the convex portion or the concave portion is greater than a thickness of the magnetoresistive layer, a distance from an end portion of at least either a convex portion or a concave portion to a base substrate is approximately equal to a distance from an end portion of a magnetoresistive layer and the base substrate, and wherein at least the convex portion or the concave portion serves as a marker for specifying a position of the magnetoresistive layer, and the marker is identifiable with an optical microscope.

2. A thin film magnetic head according to claim 1 further comprising a gap layer made of a non-magnetic material formed on the upper shield layer, and an upper core layer made of a magnetic material formed on the upper shield layer via the gap layer, wherein both of the convex portion and concave portion provided on the shield layer are provided at a position being out of a position opposing to the upper core layer.

3. A thin film magnetic head according to claim 1, wherein at least either the concave portion or the convex portion provided on the shield layer has an approximately the same width as a longitudinal width on a sliding face of a recording medium of the magnetoresistive layer.

4. A thin film magnetic head mounted on a helical scan type magnetic recording and reproducing apparatus comprising a lower shield layer made of a magnetic material formed on a substrate, a lower gap layer made of a non-magnetic material formed on the lower shield layer, a magnetoresistive layer formed on the lower shield layer via the lower gap layer, an upper gap layer made of a non-magnetic material formed on the magnetoresistive layer, and an upper shield layer made of a magnetic material formed on the magnetoresistive layer via the upper gap layer, wherein either a convex portion or a concave portion is provided on at least one principal face of the upper shield layer, a height of the convex portion or a depth of the concave portion of at least either the convex portion or the concave portion is greater than a thickness of the magnetoresistive layer, a center of at least either a convex portion or a concave portion coincides with a center of the magnetoresistive layer, and wherein at least the convex portion or the concave portion serves as a marker for specifying a position of the magnetoresistive layer, and the marker is identifiable with an optical microscope.

5. A thin film magnetic head according to claim 3, wherein at least either the concave portion or the convex portion provided on the upper shield layer has approximately the same width as a longitudinal width on a sliding face of a recording medium of the magnetoresistive layer.

* * * * *

UNITED STATES PATENT AND TRADEMARK OFFICE
CERTIFICATE OF CORRECTION

PATENT NO. : 6,683,760 B1 Page 1 of 1
DATED : January 27, 2004
INVENTOR(S) : Katsuya Kikuiri It is certified that error appears in the above-identified patent and that said Letters Patent is hereby corrected as shown below:

<u>Column 14,</u>
Line 17, after "according to" delete "claim 3," and substitute -- claim 4, -- in its place.

Signed and Sealed this

Twenty-second Day of June, 2004

JON W. DUDAS
*Acting Director of the United States Patent and Trademark Office*